United States Patent [19]

Coughlin

[11] Patent Number: 5,635,150
[45] Date of Patent: Jun. 3, 1997

[54] SORPTION OF ACIDIC GASES BY SOLID RESIDUE FROM SUGAR REFINING

[76] Inventor: Robert W. Coughlin, 49 Storrs Heights Rd, Storrs, Conn. 06268

[21] Appl. No.: 533,766

[22] Filed: Sep. 26, 1995

[51] Int. Cl.[6] .......................... B01D 53/50; B01D 53/56; B01D 53/60; B01D 53/68

[52] U.S. Cl. .................. 423/244.07; 423/242.5; 423/240 S; 423/210; 423/239.1; 127/50; 252/189

[58] Field of Search .............. 423/242.5, 244.07, 423/173, 175, 243.08, 239.1, 240 S, 210; 127/50; 252/189

[56] References Cited

U.S. PATENT DOCUMENTS

| | | | |
|---|---|---|---|
| 2,273,253 | 1/1942 | Daniels | 423/175 |
| 4,277,450 | 7/1981 | Dilworth | 423/244.08 |
| 4,726,940 | 2/1988 | Kobayashi | 423/244.08 |

FOREIGN PATENT DOCUMENTS

| | | | |
|---|---|---|---|
| 44375 | 1/1982 | European Pat. Off. | 423/175 |
| 503366 | 9/1992 | European Pat. Off. | |
| 3922310 | 1/1981 | Germany . | |
| 914614 | 3/1982 | U.S.S.R. | 71/26 |
| 551653 | 3/1943 | United Kingdom | 127/49 |
| 1600764 | 10/1981 | United Kingdom . | |

*Primary Examiner*—Steven Bos
*Assistant Examiner*—Peter T. DiMauro

[57] ABSTRACT

Solid residues formed as byproducts during the refining of sugars (e.g., beet sugar or cane sugar) are employed to sorb acidic gases such as oxides of sulfur or nitrogen. Calcines of the solid residues can also be used. Sorption of acidic gases from gaseous mixtures containing acidic gases is thus accomplished.

13 Claims, 1 Drawing Sheet

Simultaneous Calcination and Sulfation

SORPTION OF ACIDIC GASES BY SOLID RESIDUE FROM SUGAR REFINING

The United States Federal Government may have rights in this invention arising from the fact that some of the experimental data contained herein were measured during a research project sponsored by the U.S. Environmental Protection Agency at the University of Connecticut.

FIELD OF THE INVENTION

The present invention is directed to a process for removal of acidic gases such as $SO_x$, $NO_x$ or HCl from gaseous mixtures. The terms $SO_x$ and $NO_x$ as used herein stand respectively for any of the oxides of nitrogen or sulfur (e.g., $SO_2$, $SO_3$, NO and $NO_2$). This process comprises contacting gases with a waste solid material that is produced by purification of sugar solutions in sugar refining operations that employ lime or other materials containing oxides or hydroxides of alkaline earth metals.

BACKGROUND OF THE INVENTION

When fossil fuels are burned, the resulting flue gases often contain pollutants that include oxides of sulfur (e.g., $SO_2$) and oxides of nitrogen (e.g., NO). When metal ores are subjected to oxidation, such as during metal-winning operations, polluting gaseous oxides of sulfur and nitrogen are also produced. When waste materials are incinerated, the flue gases can contain not only oxides of sulfur and nitrogen but also gaseous chlorinated compounds such as HCl. Such acidic gaseous products are serious air pollutants and are also corrosive. Thus it is common practice to remove such acidic polluting gases from flue gases before they are discharged to the atmosphere. Removal of acidic gases such as $NO_x$, $SO_x$ or HCl is often accomplished by contacting the flue gas with alkaline earth compounds. As explained hereinbelow, the utilization of such compounds for capture of acidic gases from flue gases is generally in need of improvement regarding achieving more thorough utilization of the total capacity for chemical reaction of these compounds with acidic polluting gases. Moreover, it would be preferable to use or re-use waste materials for such purposes instead of virgin materials or primary or intentionally manufactured substances.

Illustrative procedures for removing acidic pollutants from flue gas are disclosed in a number of U.S. patents and all U. S. patents cited anywhere herein are intended to be fully incorporated herein by reference. In U.S. Pat. No. 4,246,245 dated Jan. 30, 1981, Abrams et al. remove $SO_2$ from gases containing the same. in either a wet or dry scrubbing process by contacting the gas with a Type S hydrated lime, which is a calcined dolomite hydrated in an autoclave at pressures of about 25 to 100 psi and temperatures of about 250° F. to 400° F. In U.S. Pat. No. 4,409,192 dated Oct. 11, 1983, Lichtner et al. remove $SO_2$ from flue gas by contacting the gas with an aqueous medium containing a water-soluble sulfonated polystyrene, an organophosphonate and a material which will react with $SO_2$ to form calcium sulfate or calcium sulfite and then separating the resulting insoluble calcium compounds from the aqueous medium. Lester et al. disclose, in U.S. Pat. No. 4,423,018, dated Dec. 27, 1983, removing $SO_2$ from a flue gas by contacting the gas with an aqueous slurry of limestone or lime buffered with a byproduct stream obtained from the manufacture of adipic acid.

College and Vlnaty disclose, in U.S. Pat. No. 4,626,418, dated Dec. 2, 1986, the removal of $SO_2$ from a gaseous mixture containing $SO_2$ by using a mixture containing a sugar and at least one alkaline earth compound selected from the group consisting of calcium and magnesium carbonates, oxides and hydroxides. A similar process is disclosed by Robinson in U.S. Pat. No. 4,861,568 dated Aug. 29, 1989. In U.S. Pat. No. 5,181,916 dated Feb. 16, 1993, Nevels discloses purifying flue gases of acidic polluting gas by contacting the flue gases with residual liquids originating from photographic, photochemical and galvanic industries. Moran et al., in U.S. Pat. No. 5,223,239 dated Jun. 29, 1993, teach a method of preparing hydrated lime for use as a sorbent for $SO_2$ removal from gas streams in which an aqueous solution of an organic solvent is used to hydrate the lime and to wash the resulting hydrate prior to drying it.

Sugar is manufactured by extracting it from plant material (e.g. sugar beets or sugar cane) into aqueous solution. The aqueous extraction produces a solution (sometimes called juice) containing, in addition to sugar, many impurities that usually are subsequently removed by adding milk of lime (a aqueous suspension of lime) and heating to about 90° C. in purification steps. In the purification process, calcined limestone (CaO) is mixed with water to produce a milk of lime slurry that is added to the beet juice in two doses called "pre liming" and "liming". Neutralization of acidity and coagulation/precipitation of proteins is associated with "pre-liming" whereas reactive destruction of impurities such as invert sugars is associated with liming. Carbonation steps (by bubbling $CO_2$) usually follow the liming steps; during carbonation, excess alkalinity is removed and calcium carbonate is precipitated. This precipitate is believed to cause further purification of the juice by sorption and occlusion of impurities on the fine $CaCO_3$ particles that are co-precipitated and thereafter readily filtered. Sometimes the precipitated $CaCO_3$ is referred to as a filter aid as well as a reagent for chemical purification of the sugar juice. The quantities of CaO added are about 2–3% by weight of the juice.

During liming, the addition of milk of lime causes coagulation and precipitation of impurities and this use of lime is often referred to as defecation. The juice is usually held at an elevated temperature during defecation. During defecation, a considerable excess of lime is introduced and this excess is subsequently precipitated as calcium carbonate by contacting the mixture with $CO_2$ during a carbonation step. The fine crystalline precipitate of $CaCO_3$ produced by carbonation causes additional purification of the sugar solution; this additional purification results from adsorption or occlusion of non-sugars by the precipitated particles of $CaCO_2$. Separation of solid material (e.g., by filtration) from the defecated and carbonated juice produces a filtered sugar juice and a solid material (solid residue) containing substantially all solid impurities and precipitated $CaCO_3$; $MgCO_3$ can also be present in this solid waste residue in the event the original lime employed was prepared from a dolomitic limestone containing Mg in addition to calcium. The clarified juice from a first liming, carbonation and solid separation is often treated by a second sequence of liming, carbonation and separation (e.g., filtration), thereby producing additional solid residue.

The solid material removed from the purified juice (e.g., by filtration) is a waste residue material that is a byproduct of sugar refining and is often referred to as filter-press mud. Herein this solid waste byproduct material is often referred to by the acronym SRSR that stands for solid residue from sugar refining. The SRSR is sometimes rinsed with water to remove residual sugar and it is then usually de-watered in a de-watering pond or lagoon or a de-watering stockpile.

Although the SRSR can contain up to about 2% sugar as it comes from the separation step (e.g., filtration), during the slow, subsequent de-watering process residual sugar is essentially completely removed by a combination of rainwater leaching and microbial action, sugar-consuming microbes being natural inhabitants of the original plant material of the sugar beets or sugar cane. These microorganisms are naturally present in the original raw material and persist throughout the various process steps. Such sugar-consuming micro-organisms are generally present in very large population densities within biofilm that forms on and adheres to particles of SRSR byproduct that are filtered from the juice. General background material on the formation and characteristics of such naturally occurring biofilms can be found in articles by Costerton et al. in Annual Reviews of Microbiology, vol. 49, pp. 711–745 (1995) and in Journal of Bacteriology, vol. 176, No. 8, pp. 2137–2142 (1994).

Silen (P. M. Silen, "Technology of Sugar Beet Production and Refining", OTS 63-11073, available from the Office of Technical Services, U. S. Department of Commerce, Copyright 1964, Israel Program for Scientific Translations, Inc.) gives the following typical component assay (in % of dry solids) of a filter press mud as obtained in a sugar plant while the solid mud residue still contains residual sugar (i.e. before removal of sugar by washing, by microbial action and other processes during de-watering: calcium carbonate 74.2, nitrogen-free organic compounds, nitrogenous organ compounds 5.9, sucrose 2.0, pectic substances 1.7, lime in the form of various salts 2.8, other mineral substances (including phosphoric acid) 3.9; total=100%. Further details regarding the refining of sugar solutions (juice) and regarding waste SRSR byproducts arising from such refining processes are disclosed and taught by Herzog in U.S. Pat. No. 5,191,723, issued Mar. 9, 1993, Haley in U.S. Pat. No. 3,734,773 issued May 22, 1973, Toth et al. in U.S. Pat. No. 4,795,494 issued Jan. 3, 1989 and Schoenrock et al. in U.S. Pat. Nos. 4,045,242, 3,982,956, 3,973,986 and 3,887,391 which were published on the following respective dates: Aug. 30, 1977, Sep. 28, 1976, Aug. 10, 1976, Jun. 3, 1975.

Generally, in comparison to natural limestones, waste SRSR separated (e.g., by filtration) from juice in sugar refining processes would not be expected to be a good sorbent material for acidic gases such as $SO_2$ for the following reasons: (1) the $CaCO_3$ or $MgCO_3$ content of such waste SRSR byproduct is significantly lower than in limestone; (2) considerable impurities have been occluded or sorbed by precipitated particles of $CaCO_3$ or $MgCO_3$ in SRSR and sorbed and occluded impurities would be expected to block the surface of the particles and impede transport of acidic gas (e.g. HCl, $SO_x$ or $NO_x$) to the surface of such particles of carbonates of alkaline earth metals in SRSR; (3) the separated waste SRSR contains adventitious solid materials brought into the sugar juice extraction process by the raw botanical plant material (e.g., sand, soil, plant fiber, leaves, etc.), all of which components further reduce the calcium content of the SRSR.

The $CaCO_3$-containing solid SRSR byproduct filtered from sugar juice during sugar refining processes is generally considered a waste material and it often is stockpiled on land surrounding sugar refining plants. There is a great need to find new uses for this waste material because it can cause stream pollution by siltation or leaching by rainwater and air pollution when it becomes airborne driven by winds. Furthermore, its stockpiling on land sites prevents the land from being used for other purposes (e.g., agriculture or forestry).

In addition to the Silen reference super, other general references on refining sugar and purification of sugar juices are: "Beet Sugar Technology", R. A. McGinnis, editor, 1982 and Kirk Othmer Enclyclopedia of Chemical Technology vol. 21, pp. 903–920 (1978).

SUMMARY OF THE INVENTION

Contrary to the expectation that the SRSR byproduct produced by defecating, carbonating and filtering sugar juice during sugar refining would be a poorer sorbent than limestone for acidic gas such as $SO_2$, I have now discovered that, surprisingly, this material is a far superior adsorbent than limestone. Moreover, and still more surprisingly, I have also found that SRSR is also superior to pure reagent grade calcium carbonate as a sorbent for the acidic gaseous impurity, $SO_2$. In one embodiment, the present invention comprises recovering the impure solid SRSR product produced as a byproduct of liming or defecation of sugar juice during sugar refining, and using this solid SRSR byproduct as a sorbent to remove acidic, gaseous impurities from a gas stream. In another embodiment, the present invention comprises contacting a gas containing an acidic gaseous component such as $SO_x$, HCl or $NO_x$ with a sorbent superior to limestone or reagent grade $CaCO_3$, said sorbent comprising SRSR byproduct material produced during the refining of a sugar juice by first defecating the sugar juice with milk of lime and filtering the mixture to obtain a SRSR byproduct material for use as said sorbent; often this embodiment will include a carbonation step subsequent to, or as part of, the defecation. Yet another embodiment of the invention comprises the process steps of: (1) adding lime or an aqueous slurry of lime (sometimes called "milk-a-lime") to a raw juice prepared by aqueous extraction of sugar beets or sugar cane, (2) reacting the mixture from step 1 with $CO_2$ in a carbonating step, (3) filtering the mixture resulting from step 2 to obtain a SRSR product, (4) recovering the SRSR product from step 3 and contacting said SRSR product with a gaseous mixture containing at least one acidic gaseous impurity in order to remove the gaseous impurity by sorption on, or reaction with, the SRSR product filtered in step 3 above.

I have also discovered that the solid sorbent arising as an SRSR byproduct from sugar juice refining need not contain sugar in order to serve as a superior sorbent for acidic gas compared to limestone or reagent grade $CaCO_3$. Accordingly I have discovered that such superior sorption performance is provided by such a SRSR byproduct that had been stockpiled and de-watered and that contained essentially no sugar as measured by a sensitive assay as described below in Example 4. Presumably this material had become de-sugared and lost its residual sugar content through microbial action and/or weathering during stockpiling. Thus, in yet another embodiment, the present invention also comprises processes in which the SRSR product produced during sugar refining by lime defecation, carbonation and filtering is de-sugared before it is employed as a sorbent for an acidic gas (e.g. $SO_x$, $NO_x$, HCl).

OBJECTS OF THE INVENTION

It is an object of the invention to provide an improved solid sorbent for acidic gases such as $SO_x$, $NO_x$ or HCl in the form of a SRSR byproduct produced during the refining of sugar juice by defecation with lime.

It is another object of the invention to provide an improved solid sorbent for acidic gases such as $SO_x$, $NO_x$ or HCl in the form of the SRSR byproduct produced during the refining of sugar juice by defecation with lime, carbonation and filtering to recover the byproduct, said byproduct containing precipitated $CaCO_3$ and impurities removed from the juice.

It is a further object of the invention to provide an improved solid sorbent for acidic gases such as $SO_x$, $NO_x$ or HCl in the form of the SRSR byproduct produced during the refining of sugar juice by defecation with lime, carbonation and filtering to recover the byproduct, wherein the said byproduct contains precipitated $CaCO_3$ and impurities removed from the juice but contains essentially no sugar.

Still another object of the invention is to provide a process for removing acidic gaseous impurities such as $SO_x$, $NO_x$ or HCl from a gas containing such an impurity by contacting said gas with the SRSR byproduct produced during the refining of sugar juice by defecation with lime, carbonation and filtering to recover said SRSR byproduct which contains precipitated $CaCO_3$ and impurities removed from the juice.

Yet another object of the invention is to provide a process for removing an acidic gaseous impurity such as $SO_x$, $NO_x$ and HCl from a gas containing such an impurity by contacting said gas with the SRSR byproduct produced during the refining of sugar juice by defecation with lime, carbonation and filtering to recover a SRSR byproduct containing precipitated $CaCO_3$ and impurities removed from the sugar juice, wherein said SRSR byproduct contains essentially no sugar or wherein said byproduct is essentially completely de-sugared (e.g., by washing) before its use as a sorbent for removing said acidic gaseous impurity.

A further object of the invention is to provide a process wherein sugar juice is refined by defecation with lime followed by carbonation and filtration to recover a SRSR byproduct containing precipitated $CaCO_3$ and impurities removed from the sugar juice, and wherein said SRSR byproduct is subsequently contacted with a gas containing acidic gaseous impurities such as $SO_x$, $NO_x$ or HCl in order to remove at least one acidic gaseous impurity by sorption on said SRSR byproduct.

It is still another object of the invention to provide a process wherein sugar juice is refined by defecation with lime followed by carbonation and filtration to recover a SRSR byproduct containing precipitated $CaCO_3$ and impurities removed from the sugar juice, and wherein said SRSR byproduct is subsequently contacted with a gas containing acidic gaseous impurities such as $SO_x$, $NO_x$ or HCl in order to remove at least one acidic gaseous impurity from the gas by sorption on said SRSR byproduct, and wherein said SRSR byproduct recovered by filtration is essentially free of sugar or is de-sugared essentially completely before its use as a sorbent for removing said acidic gaseous impurity.

Yet another object is to remove acidic components from a gas using SRSR as specified in the objects recited supra, wherein the SRSR is calcined before or while it is placed in contact with the gas.

An additional object is to provide a superior sorbent or reactant for removing acidic components from a gas, said sorbent or reactant being SRSR or a calcine of SRSR.

Other objects and advantages will be apparent to those skilled in the art from the following detailed description of preferred embodiments taken in conjunction with the drawing and the appended claims.

DETAILED DESCRIPTION OF THE INVENTION

Figure 1:
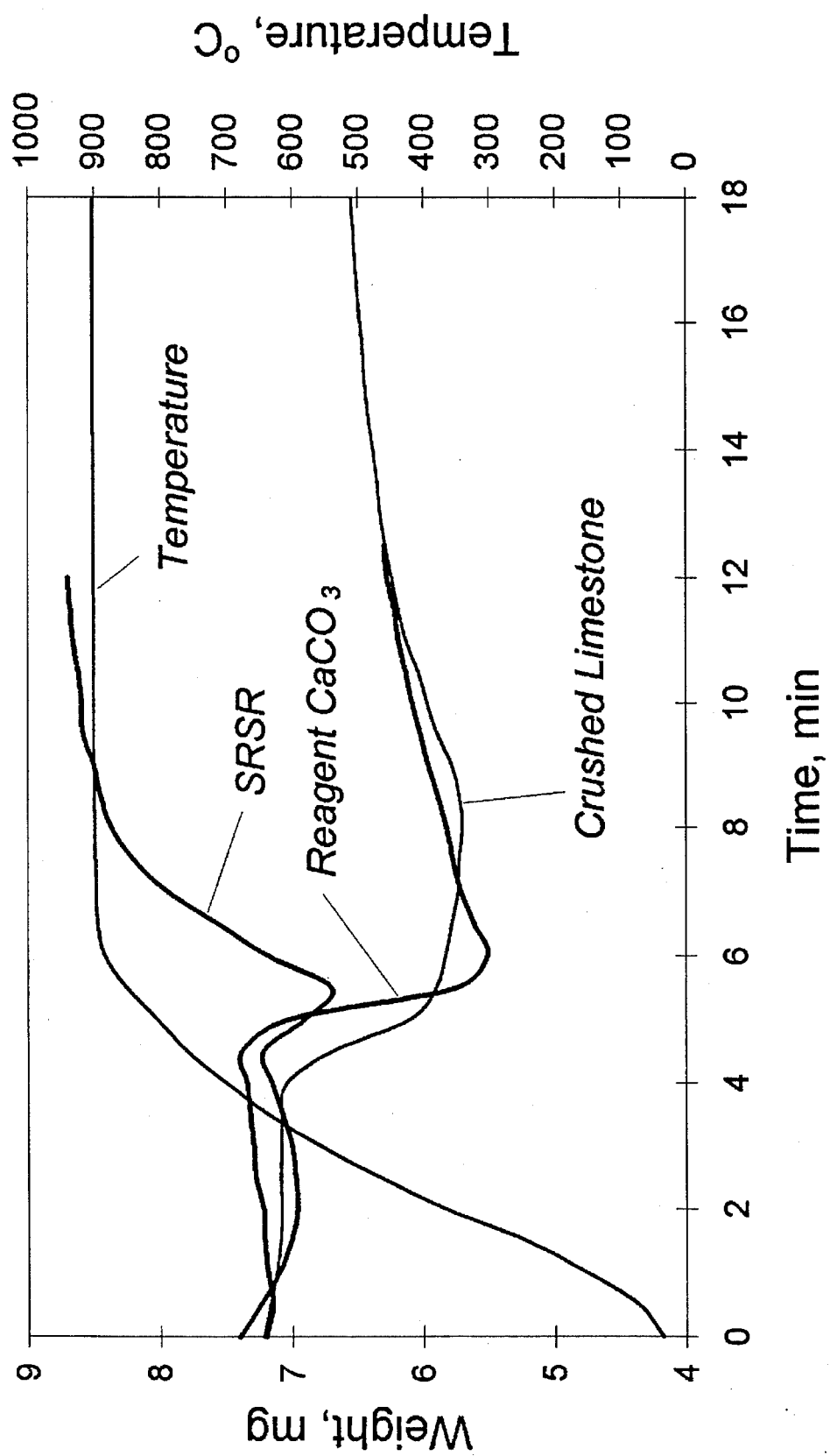
FIG. 1 is a graphical depiction of the course of reaction of a SRSR byproduct from sugar juice refining with $SO_2$ in air as the temperature is raised from about room temperature to about 900° C. over a time period of about 10–15 minutes. The weight of a sample of the byproduct is plotted versus time of exposure to a mixture of $SO_2$ in air while the temperature of the sample is increased to promote sorptive chemical reaction of $SO_2$ with the sample. Also plotted on FIG. 1 for comparison are the measured weights of a sample of a commercial limestone and a sample of pure reagent grade $CaCO_3$ while exposed to the same gaseous mixture of $SO_2$ in air under the same experimental conditions. The temperature of the process is also plotted versus time in FIG. 1.

Having been summarized above, the invention will be described below in terms of preferred embodiments and Examples which are merely exemplary of the invention, which may be embodied in many forms. Therefore the specific structural and functional details disclosed herein are not to be interpreted as limiting, but merely as a basis for the claims and as a representative basis for teaching one skilled in the art to variously employ the present invention in virtually any appropriately detailed structure or manner.

Acidic Gas Capture by Carbonate Compounds

It has long been known that natural limestones (and related carbonate compounds and minerals), which are widely used in the electric power industry to remove $SO_2$ from flue gas for pollution control, have limited reactivities for combining chemically with acidic gases such as $SO_x$, $NO_x$ or HCl. This behavior occurs because the products of the chemical reactions [e.g. solid $CaSO_4$, $Ca(NO_3)_2$, $CaCl_2$, $MgSO_4$, $MgSO_3$, $Mg(NO_3)_2$, $MgCl_2$] have relatively large molar volumes compared to the carbonates or oxides of Ca and Mg. This is evident from the following table of approximate molar volumes in units of $cm^3/mole$:

| | |
|---|---|
| $CaCO_3$ | 37.1 |
| CaO | 16.6 |
| $CaSO_4$ | 55.5 |
| $Ca(NO_3)_2$ | 69.5 |
| $CaCl_2$ | 44.2 |
| $MgCO_3$ | 27.6 |
| MgO | 11.2 |
| $MgSO_4$ | 45.1 |
| $MgSO_3$ | 60.1 |
| $Mg(NO_3)_2$ | 73.1 |
| $MgCl_2$ | 41.0 |

When carbonates of alkaline earth metals are contacted with a gas mixture containing acidic components, the following representative reactions can take place if the gas also contains oxygen in addition to the acidic gas:

$$CaCO_3 + SO_2 + \tfrac{1}{2} O_2 \rightarrow CaSO_4 + CO_2 \qquad (1)$$

$$CaCO_3 + 2NO + \tfrac{3}{2} O_2 \rightarrow Ca(NO_3)_2 + CO_2 \qquad (2)$$

$$MgCO_3 + SO_2 + \tfrac{1}{2} O_2 \rightarrow MgSO_4 + CO_2 \qquad (3)$$

$$MgCO_3 + 2NO + \tfrac{3}{2} O_2 \rightarrow Mg(NO_3)_2 + CO_2 \qquad (4)$$

or when the gas does not contain oxygen:

$$CaCO_3 + SO_2 \rightarrow CaSO_3 + CO_2 \qquad (5)$$

$$CaCO_3 + 2NO \rightarrow Ca(NO_2)_2 + CO_2 + \tfrac{1}{2} N_2 \qquad (6)$$

$$MgCO_3 + SO_2 \rightarrow MgSO_3 + CO_2 \quad (7)$$

$$MgCO_3 + 3NO \rightarrow Mg(NO_2)_2 + CO_2 + \tfrac{1}{2} N_2 \quad (8)$$

or independent of whether the gas contains oxygen:

$$CaCO_3 + 2HCl \rightarrow CaCl_2 + H_2O + CO_2$$

$$MgCO_3 + 2HCl \rightarrow MgCl_2 + H_2O + CO_2$$

Generally, the sulfites and nitrites are not stable and may not form, or may decompose, depending on temperature and other conditions.

Acidic gases such as $SO_2$, NO or HCl can also react with calcined limestone or calcined carbonates (e.g. with CaO or MgO), in which case the products of the reactions are substantially the same as shown by the chemical reaction equations above, except $CO_2$ is not produced because it was previously removed from the solid limestone or carbonate during calcination.

When gas-solid reactions such as those described supra are conducted, even under thermodynamically and kinetically favorable conditions (e.g., 750°–950° C., 1 atm, 0.1% $SO_2$ in air), large portions of Mg and Ca oxides, carbonates or carbonate minerals usually fail to react. Therefore, the high density oxides or carbonates of Ca or Mg are not completely converted to the corresponding lower density sulfate, sulfite, nitrate, nitrite or chloride. As the lower density reaction products (e.g., sulfate, nitrate or chloride) begin to form on the surfaces or in the outer regions of the carbonate or oxide particles, these more voluminous, lower density reaction products block the outer surfaces and fill the pores of the solid particles, thereby sealing off the interiors of the particles. Once the reactive interior particles are sealed off, the acidic gases cannot penetrate into the interior regions of the solid particles, with the result that chemical reaction ceases or is drastically reduced and the oxide or carbonate compounds within the interiors of the particles fail to react completely. General references which explain effects of the build-up of sulfation reaction products on limestone particles where they form a barrier to complete reaction are the following papers by Hartman et al.: Industrial & Engineering Chemistry, Process Design & Development 13, pp 248–253 (1974); 17, pp 411–419 (1978) and AIChE Journal 22, PP 490–498 (1976).

Such incomplete reaction has been observed not only for reactions of acidic gases with of the carbonates of alkaline earth metals, but also for their calcines, (e.g. CaO or MgO). Thus even when extensive porous networks are developed in these solid materials by calcination in a first step, followed by reaction with an acidic gas in a second step, substantial portions of the Ca and Mg inside the particles fail to react. The result is that utilization of the theoretical sorption or reaction capacity of the carbonate or oxide material for $SO_x$, $NO_x$ or HCl remains incomplete; i.e. the Ca and Mg in the interior portion of the solid particles are prevented from reacting with the acid gas.

The SRSR muds contemplated as improved sorbents for capturing acidic gases according to the present invention can be produced in a wide variety of sugar juice refining processes. Preferred materials are produced during refining of sugar juices made from beets and sugar cane and can arise from liming, pre-liming, first carbonation, second carbonation or any process step that causes impurities, $CaCO_3$, or other compounds of calcium or magnesium to precipitate from the sugar juice undergoing purification. Generally, the SRSR can contain from about 25% to about 99% $CaCO_3$ with the preferred range being about 50% to about 95% $CaCO_3$.

Generally, it is economically advantageous in a sugar refining process to remove as much of the residual sugar as possible from the SRSR (e.g. by back-washing it in a filtration operation) in order to reduce economic losses owing to unrecovered product. As the SRSR undergoes slow de-watering upon standing, microbial activity will tend to reduce its sugar content to minuscule concentrations. From the environmental standpoint, it is important that the sugar content of the SRSR be reduced to the lowest possible values before the SRSR is stored in stockpiles exposed to the elements or shipped in open trucks or railroad cars. To the extent sugar is removed from the SRSR before it is stockpiled and exposed to precipitation, this will prevent leaching of sugar therefrom and thus reduce run-off of polluting leachate into rivers and streams.

SRSR can be used to capture acidic gases in the de-watered or dried condition, or it can be slurried with water or aqueous solutions for use in wet scrubbing processes. In one type of dry process for acidic gas sorption, the gas is passed through a bed of dried or de-watered SRSR; the SRSR can have been previously pelletized or agglomerated into a larger conglomerated particles before use, or it can be used without previous pelletization or agglomeration. In another type of dry process, dried or de-watered SRSR is injected directly into a duct or conduit carrying flowing gas, or injected into a fluidized bed combustion zone. Aqueous slurries of SRSR can also be injected into fluidized bed combustors or into gas flow conduits. In typical wet scrubbing processes, aqueous slurries of SRSR can flow counter currently to gases in towers or columns designed for removing acidic gases from gas streams by wet scrubbing.

Any gaseous mixture containing an acidic gas such as $SO_x$, $NO_x$, HCl, HF or HBr can be treated according to the present invention to remove an acidic gas therefrom. In many instances the gaseous mixtures containing acidic gases that are treated herein are those resulting from the oxidation, for example, burning, of fossil fuels such as coal and petroleum oils, of waste materials such as plastics or sludges, of metal ores or solid wastes (e.g., from municipalities or from industrial operations). These gaseous mixtures can contain, for example, on a dry volume basis, from about 8 to about 20% carbon dioxide, about 2 to about 16% oxygen, about 0.1 to about 0.4% $SO_2$, about 0.1 to about 30% HCl, small amounts of nitrogen oxides ($NO_x$), and the remainder being substantially nitrogen.

A mixture of combustion gases to be treated herein can be contacted with SRSR immediately upon leaving the burner, but preferably, for example, when fuels are burned, after the gaseous mixture of combustion gases is first passed through a heat exchanger or boiler, wherein steam is generated, and the gaseous mixture is then at a reduced temperature level. Thus a gaseous mixture containing an acidic gas can be treated when said gaseous mixture is in the range of about 100° to 2400° F. The gaseous mixture can be treated at any pressure, but generally will be at about atmospheric pressure.

The amount of SRSR used to treat a gaseous mixture containing an acidic gas will be in an amount such that the molar equivalents of alkaline earth compounds in the SRSR mud relative to the acidic gas molar equivalents in the gaseous mixture being treated will be in the range of about 0.5:1 to about 3:1, preferably about 1:1 to about 2:1.

In some cases it will be advantageous to calcine SRSR at temperatures of from about 500° to 2000° F. before the calcined SRSR is used to treat gaseous mixtures herein. In other cases the SRSR will be used directly, without pre-calcining, to treat gaseous mixtures herein. Generally, pre-calcining is preferable when gas treatment temperatures are too low to cause calcination of the alkaline earth carbonates in the SRSR.

Treatment of the gaseous mixture containing an acidic gas (e.g. $SO_x$, $NO_x$, HCl, HF) is conducted in any convenient or suitable manner that will bring about effective contact between the gaseous mixture and the SRSR. One method involves dry spray injection of the SRSR into a flowing stream of a gaseous mixture containing acidic gas. The resulting gas stream is then treated by any suitable separating means, for example, a filter, wherein particulate matter, such as SRSR mud components, fly ash, etc., are separated and a gaseous mixture having a substantial reduced content of acidic gases is obtained. Alternatively, a gaseous mixture containing an acidic gas can be passed through a fluidized bed containing SRSR, a gaseous stream can be removed from the fluidized bed, and entrained particulate matter can be removed from the latter gaseous stream so that a gaseous stream is recovered that has a substantially reduced content of acidic gas. Still another procedure that can be used is to pass the gaseous mixture containing an acidic gas through a fixed bed containing SRSR, removing a gaseous stream therefrom, separating entrained particulate matter from said gaseous stream and recovering a purified gaseous stream of substantially reduced content of acidic gas.

The contact time required for the SRSR to remove an acidic gas from a gaseous stream containing said acidic gas will depend on process conditions, concentrations and the extent of removal desired. Generally such contact times will range from about a second to several minutes. Often shorter contact times will be required if pre-calcined SRSR is employed.

EXAMPLES

The practice of the invention is illustrated by the following specific examples which are not to be understood to limit the invention.

Example 1

This Example presents a theoretical computation of the increase of weight of a solid particle of $CaCO_3$ or $MgCO_3$ if it were to react completely according to reactions (1) or (3) above, respectively. The weight increase for complete reaction is readily computed from the molecular weights of the solid reactants ($MgCO_3$ or $CaCO_3$) and the corresponding solid products ($MgSO_4$ or $CaSO_4$). The weight gain for sulfation of a particle of $CaCO_3$ in the presence of oxygen is computed as follows:

$$[(MW_{CaSO4}-MW_{CaCO3})/MW_{CaCO3}=(136-100)/100=0.36 \text{ or } 36\%$$

where MW refers to the molecular weight of the subscripted compound. If $MW_{MgSO4}$ and $MW_{MgCO3}$ are used in the formula above the predicted weight gain for sulfation of $MgCO_3$ in the presence of oxygen is 41%.

Example 2

This Example presents a theoretical computation of the increase in mass of a solid particle of CaO or MgO if it were to react completely with $SO_2$ and oxygen according to the reactions:

$$CaO+SO_2+(\frac{1}{2}) O_2 \rightarrow CaSO_4$$

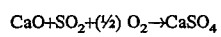

$$MgO+SO_2+(\frac{1}{2}) O_2 \rightarrow MgSO_4$$

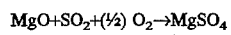

The mass increase for complete reaction is computed from the molecular weights of the solid reactants (CaO or MgO) and the corresponding solid products ($CaSO_4$ or $MgSO_4$). The weight gain for sulfation of a solid particle of CaO in the presence of oxygen is computed as follows:

$$(MW_{CaSO4}-MW_{CaO})/MW_{CaO}=(136-56)/56=1.43 \text{ or } 143\%$$

By the same procedure the predicted weight gain for sulfation of MgO in the presence of oxygen is 200%.

Example 3

This Example presents a theoretical computation of the weight loss that occurs when a particle of $CaCO_3$ or $MgCO_3$ is calcined completely according to the reactions:

$$CaCO_3 \rightarrow CaO+CO_2$$

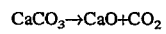

$$MgCO_3 \rightarrow MgO+CO_2$$

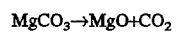

Using calculation methods similar to those employed in Examples 1 and 2, the weight loss during calcination of $CaCO_3$ is given by:

$$(MW_{CaCO3}-MW_{CaO})/MW_{CaCO3}=(100-56)/100=0.44 \text{ or } 44\%$$

By the same calculation procedure, the predicted weight loss for calcination of $MgCO_3$ is 52%.

Example 4

A sample of de-watered filtration mud (i.e., a waste, SRSR byproduct) produced during beet-sugar refining was obtained from the Amalgamated Sugar Company, Twin Falls, Id. This material was dried in a desiccator and assayed for sugar by the following procedure:

A 10-g dry sample of the SRSR material was added to 100 ml of distilled water and agitated at room temperature over a weekend. After settling, 150 μl of the supernatant solution was added to each of three tubes. Analytical standards were also prepared by adding to similar tubes equal volumes (150 μl) of glucose solution of the following concentrations (μg/ml) 80, 50, 40, 30, 20, 10, 0(blank); these standard solutions were also prepared in triplicate tubes. To each tube 150 μl of 5% phenol solution was added and each tube mixed, followed by the addition of 750 μl of concentrated sulfuric acid, again with mixing After 30 minutes elapsed time to permit color development, the absorbance of each solution against the blank was measured using a spectrophotometer at 490 mm. Using a standard curve constructed from the measurements with the standard solutions, the sugar concentration in the original SRSR byproduct waste was computed as 0.01% equivalent glucose. This assay procedure is reported to be accurate to ±0.02% and is discussed in detail by Dubois et al. in an article published in Anal. Chem. vol. 28, pp. 350–356 (1956). Thus it is evident that this waste mud SRSR contains essentially no sugar. This SRSR mud was used in the experiments of Examples 5 and 6 below.

Example 5

The SRSR obtained from Amalgamated Sugar Company (same SRSR of Example 4) was compared to a crushed, commercial, pelletized, dolomitic limestone and a reagent grade $CaCO_3$ with respect to reaction with $SO_2$ by continuous weighing of dried samples in a microbalance while exposed to air containing $SO_2$ at a concentration of 2.5% (molar), and while the samples were heated according to a temperature program from room temperature to about 900° C. during a time period of about 7 minutes or more. According to the supplier (Whites Pelletizing Company, St. Paul, Va.) the limestone analysis (in %) was Ca 21, CaO 29, $CaCO_3$ 52, Mg 12, MgO 19, $MgCO_3$ 40, $CaCO_3$ equivalent 100. The experimental procedure that was employed is sometimes termed thermogravimetric analysis, here conducted in an environment containing $SO_2$ and oxygen.

The results of the experiments of this Example are plotted in FIG. 1 as sample weight versus time; programmed sample temperature is also plotted versus time on the same graph. Extraordinary behavior of the SRSR in comparison with the other materials is evident from FIG. 1. After a small initial weight loss the SRSR increased in weight as a result of reaction with the $SO_2$ and oxygen to form sulfate and perhaps other solid products. The net weight gain of the SRSR sample was about 17-18%. In contrast, the other materials lost considerable weight initially owing to calcination, but later regained only a small amount of this weight loss owing to subsequent sulfation. In fact, the limestone and $CaCO_3$ samples experienced a net weight loss indicating they reacted only slightly with the $SO_2$. According to the theoretical stoichiometric calculation of Example 1, a pure sample of $CaCO_3$ should experience a net weight gain of 36% upon complete reaction to form $CaSO_4$ (i.e., if reacted completely with $SO_2$ to form the sulfate). From FIG. 1 it is evident that not only was the extent of reaction of SRSR with $SO_2$ impressively greater than of the other solid materials, but the rate of reaction of SRSR was also much greater than that of the other materials.

Thus it is clear from Example 5 that SRSR is far superior to limestone or pure reagent $CaCO_3$ regarding removing $SO_2$ from a gas. As evident from FIG. 1, the behavior of SRSR in comparison with either limestone or reagent grade $CaCO_3$ regarding adsorption and reaction with $SO_2$ is so unexpectedly extraordinary with respect to both rate and extent of reaction that the SRSR appears to be a fundamentally different material. The experiments of Example 5 were repeated several times with each material and the results regarding weight changes were in agreement with each other to about ±2 % for each material.

Example 6

The experiments of Example 5 were repeated except that a two-step procedure was employed.:

1. a first step calcination in the absence of $SO_2$ while the temperature rose from room temperature to 900° C., followed by:
2. a second step sulfation of the calcined sample during which it was exposed to 2.5% $SO_2$ in air at 700°-900° C. for several minutes. The measured results of the first-step calcinations were as follows:

| Weight Loss By Calcination | |
| --- | --- |
| SRSR | 38% |
| Reagent $CaCO_3$ | 41% |
| Commercial dolomitic limestone | 43% |

These results may be compared to the theoretical computed weight loss of 44% for pure $CaCO_3$ or 52% for pure $MgCO_3$ as illustrated by the stoichiometric calculation presented in Example 3 above. It is likely that the lower weight loss during calcination of SRSR may reflect lower concentrations of Ca and Mg and higher concentrations of impurities in SRSR.

The measured results of the sulfations ( as a second step after calcination) were as follows:

| Weight Gain By Sulfation | |
| --- | --- |
| Calcine of SRSR | 95% |
| Calcine of Reagent $CaCO_3$ | 61% |
| Calcine of commercial limestone | 26% |

These results may be compared to the theoretical computed weight gains of 143% or 200% for sulfation of a calcine of pure $CaCO_3$ or a calcine of pure $MgCO_3$ respectively, as presented in Example 2 above. The experiments of Example 6 were repeated several times with each material and the results regarding weight changes were in agreement with each other to about ±2 % for each material.

From the foregoing examples it is evident that waste filtration mud from sugar refining (i.e., SRSR) is a far superior sorbent for an acidic gas such as $SO_2$ compared to a commercial limestone or a reagent grade $CaCO_3$. According to the data of Example 6, a calcine of SRSR captures more than three times more $SO_2$ than an equal amount of a calcine of a commercial limestone. This is a very surprising result in view of the many impurities in SRSR mud and its reduced content of alkaline earth carbonates, compared to limestone or reagent grade $CaCO_3$. According to its supplier, the SRSR mud contained only about 32.7% calcium or 82% $CaCO_3$ whereas the commercial limestone contained 92% of alkaline earth carbonates (52% $CaCO_3$+40% $MgCO_3$).

The more than 300% greater capacity for capture of $SO_2$ by the calcined SRSR waste mud compared to calcined commercial limestone may be compared to an improvement of only 130 % observed by College et al.[U.S. Pat. No. 4,626,418; Dec. 2, 1986] when 10 % of sugar was added to a mixture of Mg and Ca hydroxides. When College et al. used 0.1% sugar, the improvements in $SO_2$ capture ranged from about 6% to about 89%. Moran et al. [U.S. Pat. 5,223,239; Jun. 29, 1993] found only about 25–100% improvement in $SO_2$ capture by lime prepared by their improved method, as compared to a commercial lime.

Thus it is evident from the Examples hereinabove that substitution of a calcined waste SRSR produced as a byproduct in sugar refining leads to a greater than 300% improvement (compared to a calcined commercial limestone) in capture of $SO_2$ from a gas stream comprising $SO_2$ and air. This enormous improvement stands in contrast to the several reasons cited supra why SRSR would be expected to be inferior to limestone for capturing $SO_2$.

While the foregoing disclosure contains many specificities, these should not be construed as limitations on the scope of the invention, but rather as exemplifications of preferred embodiments thereof. For example, many different types of gas streams can be purified of many different types of acidic components by SRSR according to the present invention. Similarly, SRSR can be produced by many different types of sugar refining processes that employ lime, limestone or other material containing an oxide or hydroxide of an alkaline earth metal and SRSR can be dried, de-sugared, calcined or otherwise pre-treated before it is used to purify a gas. Moreover, SRSR can be produced during refining of different types of sugar juice obtained from a variety of plant raw materials, e.g. the production of fructose from various fruits or from the root of the Jerusalem artichoke. Also, SRSR can be contacted with gases according to a variety of different processing schemes. Accordingly, the scope of the invention should be determined not by the embodiments illustrated, but by the appended claims and their legal equivalents.

The claims intended to be covered by letters patent are:

I claim:

1. A method of removing an acidic component of a gaseous mixture containing said acidic component comprising the steps:
   a) adding oxides or hydroxides of calcium to a sugar juice produced by aqueous extraction of a plant material,
   b) recovering from said sugar juice a solid residue that contains at least a portion of the calcium added in step a,
   c) contacting said solid residue from step b with said gaseous mixture in order to purify said gaseous mixture by removing said acidic component therefrom by reaction of said acidic component with said solid residue at a temperature of from about 900° C. up to about 1316° C.,
   d) conducting the reaction of step c under such conditions that said solid residue increases in weight on a dry basis, and
   e) separating said solid residue from the purified gaseous mixture produced in step c.

2. The method according to claim 1 wherein the mixture from step a is carbonated with $CO_2$ before recovery of the solid residue in step b.

3. The method according to claim 2 wherein the residue recovered in step b is at least partially de-sugared before contacting it with the gaseous mixture in step c.

4. The method according to claim 2 wherein said solid residue is calcined before or during step c.

5. The method according to claim 3 wherein said solid residue is calcined before or during step c.

6. The method according to claim 4 wherein said plant material is chosen from the group consisting of sugar beets and sugar cane.

7. The method according to claim 5 wherein said plant material is chosen from the group consisting of sugar beets and sugar cane.

8. A process for producing a product useful for sorbing or reacting with acidic gases comprising the steps:
   a) adding oxides or hydroxides of calcium to a sugar juice produced by aqueous extraction of a plant material,
   b) recovering from said sugar juice a solid residue that contains at least a portion of the calcium added in step a, and
   c) contacting the solid residue recovered in step b with a gaseous mixture containing an acidic gas at a temperature of from about 900° C. up to about 1316° C. so as to calcine said solid residue.

9. The process according to claim 8 wherein said process comprises the additional step of at least partially desugaring the solid residue recovered in step b before calcining in step c.

10. The process according to claim 8 wherein said plant material is chosen from the group consisting of sugar beets and sugar cane.

11. A method of removing an acidic component of a gaseous mixture containing said acidic component comprising the steps:
    a) adding oxides or hydroxides of calcium to a sugar juice produced by aqueous extraction of a plant material,
    b) recovering from said sugar juice a solid residue that contains at least a portion of the calcium added in step a,
    c) contacting said solid residue from step b with said gaseous mixture in order to purify said gaseous mixture by removing said acidic component therefrom by reaction of said acidic component with said solid residue,
    d) conducting the reaction of step c at a temperature within the approximate range of from about 900° C to about 1316° C.,
    e) separating said solid residue from the purified gaseous mixture produced in step c.

12. The method according to claim 11 wherein the mixture from step a is carbonated with $CO_2$ before recovery of the solid residue in step b and the residue recovered in step b is at least partially desugared before contacting it with the gaseous mixture in step c.

13. The method according to claim 12 wherein said plant material is chosen from the group consisting of sugar beets and sugar cane.

* * * * *